United States Patent Office 3,481,899
Patented Dec. 2, 1969

3,481,899
ORGANOSILOXANE COMPOSITION
Heinrich Marwitz, Siegfried Nitzsche, and Ewald Pirson, Burghausen, Germany, assignors to Wacker-Chemie G.m.b.H., Munich, Bavaria, Germany
No Drawing. Continuation-in-part of application Ser. No. 246,682, Dec. 24, 1962. This application Apr. 16, 1968, Ser. No. 721,630
Int. Cl. C08g 47/02
U.S. Cl. 260—17.4       5 Claims

ABSTRACT OF THE DISCLOSURE

This invention relates to an organic solvent solution containing at least one organopolysiloxane and an aluminum secondary alcoholate or an organic solvent soluble partial hydrolyzate of said aluminum secondary alcoholate, the organic radical in the alcoholate being a monovalent hydrocarbon radical. Expediently, the solutions of the organopolysiloxane and the aluminum secondary alcoholate or the partial hydrolyzate of the aluminum alcoholate also contain aluminum chelates. Fibrous materials are rendered water repellent by treatment with the above solutions.

---

This application is a continuation-in-part of application Ser. No. 246,682, filed Dec. 24, 1962, now abandoned.

It has long been known that a wide variety of materials and particularly fibrous materials such as textiles and papers can be rendered water repellent by treatment with organosiloxane polymers. The siloxanes employed as water repellents have frequently contained hydrogen bonded directly to silicon as in methylhydrogensiloxanes. The hydrogen on silicon is not stable in water emulsions, hence organic solvent solutions of the siloxanes have frequently been employed. Furthermore, the organic solvent solutions of siloxanes have avoided or decreased the problems of swelling and crease formation encountered when aqueous systems are employed.

The siloxanes are usually cured on the paper or textile and metal compounds are frequently incorporated in the treating solution to catalyze the cure. The metal compounds may accelerate the cure and improve the resulting water repellency. Particularly useful metal compounds for this purpose are alcoholates and chelates of titanium, zirconium, tin, zinc and aluminum. The alcoholates of titanium, zirconium and zinc are difficult and expensive to obtain, easily split off silicon-bonded hydrogen and frequently cause extensive discoloration of the materials treated with them. The chelates of titanium, zinc and zirconium and the alcoholates of aluminum, particularly aluminum isopropylate have not been very effective as catalysts.

It is the object of the invention to introduce a new composition suitable for rendering fibrous materials water repellent. Another object is a new siloxane-metal catalyst mixture in organic solvent. Readily cured siloxane-metal catalyst masses are also sought. Another object is a concentrate of siloxane-metal catalyst in organic solvent suitable for further dilution and application to paper and textiles. Other objects and advantages of this invention are detailed in or will be apparent from the disclosure and claims.

This invention relates to an organic solvent solution of at least one organopolysiloxane of the general unit formula

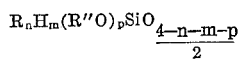

wherein each R is a monovalent hydrocarbon radical, $n$ has a value from 0 to 3, $m$ has a value from 0 to 3, $p$ has a value from 0 to 1, in the polymer the average value of $n$ being from 0.8 to 2.8, the average value of $m$ being from 0 to 1.2, the average value of $p$ being from 0 to 1 and the average value of $m+n+p$ being from 1 to 2.8 and R″ is a hydrogen atom or monovalent hydrocarbon radical and an aluminum compound of the formula

where each R′ is a monovalent hydrocarbon radical, or an organic solvent soluble partial hydrolyzate of said a aluminum compound.

The siloxanes employed herein can be homopolymers, copolymers and mixtures and are essentially free of $SiO_{4/2}$ units. Typical of the operable siloxanes are fluids of the unit formula $R_2SiO$, resins of the unit formula $R_{(1.0\ to\ 1.7)}SiO_{(3/2\ to\ 2.3/2)}$, and organohydrogensiloxanes of the unit formula RHSiO. Mixtures of such siloxanes and copolymers of such units are well known and widely employed. The siloxanes can be endblocked with triorganosilyl units of the formula $R_3SiO_{1/2}$ or with hydroxy radicals (OH) or hydrocarbonoxy radicals (RO—). Furthermore, the siloxanes can contain up to one hydroxyl or hydrocarbonoxy radical per silicon atom. The operable siloxanes range from low viscosity fluids up to high viscosity gum-like solvent soluble materials but it is preferred to employ fluids of from 5 to 100,000 cs. viscosity at 25° C.

In the siloxanes, the organic substituents represented by R bonded to silicon through C—Si bonding and the organic radicals represented by R″ bonded to silicon through C—O—Si bonding are monovalent hydrocarbon radicals illustrated by alkyl radicals such as methyl, ethyl, n-propyl, isopropyl, n-butyl, sec-butyl, tert-butyl, n-octadecyl and isomeric octadecyl radicals; alkenyl radicals such as vinyl, allyl, hexenyl, cyclohexenyl and cyclobutenyl; alicyclic radicals such as cyclopentyl and cyclohexyl; aryl radicals such as phenyl, naphthyl and xenyl; alkaryl radicals such as tolyl and xylyl radicals; and aralkyl radicals such as benzyl and phenylethyl. It is preferred to employ siloxanes wherein the radicals represented by R and R″ contain less than 8 carbon atoms and the most preferred species of R and R″ are methyl, ethyl, vinyl and phenyl radicals.

The siloxanes employed herein are essentially free of $SiO_2$ units. The best known and least expensive siloxanes employed herein are polymers, copolymers and mixtures of dimethylsiloxane units, methylhydrogensiloxane units, monomethylsiloxane units and trimethylsiloxane units. Preferred are the linear siloxanes but cyclic siloxanes can be employed. In the absence of HSi groups it is preferred to have at least some R″O groups present in the siloxane polymer molecule to permit further condensation polymerization during the cure. Attention is called to the following patents setting forth operable siloxanes for this invention: U.S. Patents Nos. 2,588,365, 2,588,366, and 2,588,367, issued Mar. 11, 1952; U.S. Patent No. 2,728,692, issued Dec. 27, 1955; and U.S. Patent No. 2,807,601, issued Sept. 24, 1957.

The aluminum compounds employed herein are sec-alcoholates of the formula

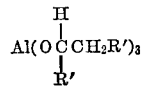

In the formula, R′ is a monovalent hydrocarbon radical such as illustrated above for R. Preferably R′ is an alkyl radical of 1 to 4 carbon atoms. The aluminum sec-alcoholates are prepared by known methods in good yield.

They can be prepared by reacting finely divided metallic aluminum with a sec-alcohol or by an ester interchange reaction between an aluminum alcoholate of a lower alcohol, e.g. aluminum isopropylate and a sec-alcohol with distillation of the liberated isopropanol. Alternatively, the aluminum compounds employed herein can be prepared by adding an excess of sec-alcohol to a solution of aluminum chloride in a suitable organic solvent such as benzene, precipitating ammonium chloride with dry ammonia and filtering and distilling the fluid.

The aluminum alcoholates can be partially hydrolyzed and condensed to produce organic solvent soluble alcoholates which are operable herein.

The organic solvents employed herein are any of those commonly employed with organosiloxane polymers. Those hydrocarbon solvents which are fluid at 18° C. and boil under 150° C. are preferred and include petroleum ethers, benzine, benzene, toluene and xylene as well as halogenohydrocarbons such as $CCl_4$, trichloroethylene, perchloroethylene, and methylene chloride. The chlorinated solvents and other solvents which catalyze the cleavage of hydrogen from silicon should not be used when the siloxane contains some hydrogen bonded to silicon.

Expediently, the solutions of this invention also contain organic compounds which will form chelates with metals and metal compounds. Particularly useful as additives are beta-diketones of the formulae

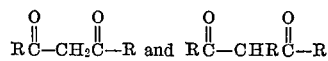

and beta-ketoesters of the

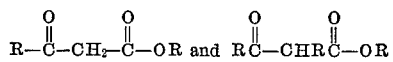

as well as oxyketones of the formula

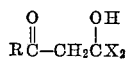

where R is a monovalent hydrocarbon radical and X is a monovalent hydrocarbon radical or hydrogen. Examples of operative additives include acetyl acetone, acetoacetic acid ethyl esters, 2,4 - hexanedione, 2,4-heptanedione, 5-methyl-2,4-hexanedione, 2,4-octenedione, 5,5-dimethyl-2,4-hexanedione, 3-ethyl-2,4-pentanedione, 3,3-diethyl-2,4-pentanedione, 2,2-dimethyl-3,5-nonanedione, 1-cyclohexyl-1,3 - butanedione, 5,5 - dimethyl - 1,3 - cyclohexanedione, 1-phenyl-5,5-dimethyl-2,4-hexanedione, diacetone alcohol, benzoin, acetol, acetoin, acetopropanol, acetoacetic ester, alkyl acetoacetates and aryl acetoacetates. Also operative are oxycarboxylic acids such as lactic acid. Carboxylic acids which do not form chelates with metals, preferably alkylmonocarboxylic acids such as acetic acid can be employed. The additives disclosed and defined above are preferably employed in amounts of from 1 to 2 mols of additive per mol of aluminum alcoholate present but larger amounts can be used though no advantage is gained and smaller amounts will produce progressively less effect in the solution.

It is assumed, but it is not necessary to this invention, the additives mentioned above react with the aluminum tri-sec. alcoholates. Thus, aluminum tri-sec.-butanolate will yield the following, depending on additive and proportion employed, i.e. 1 or 2 mols additive per mol aluminum:

aluminum di-sec-butanolate-monoacetoacetic acid ethyl ester
aluminum mono-sec-butanolate-diacetoacetic acid ethyl ester
aluminum di-sec-butanolate-mono-acetyl acetonate
aluminum mono-sec-butanolate-di-acetyl acetonate
aluminum di-sec-butanolate-monoacetate
aluminum mono-sec-butanolate-diacetate The additive can be introduced before, concurrently with, or after the aluminum alcoholate and organosiloxane are mixed. The aluminum alcoholate and organosiloxane can be mixed in any desired manner. Generally, 1 to 50 percent by weight of aluminum alcoholate is employed based on the weight of siloxane present. The preferred range is 10 to 30 percent by weight aluminum compound on the stated basis.

The compositions of this invention can be stored and shipped as concentrates containing 30 to 80 percent by weight of solids (i.e. siloxane polymer, aluminum compound and additives) in organic solvent. This is in contrast to previously known water repellents based on siloxanes which would gel and otherwise deteriorate in concentrated solutions, hence were stored and shipped in solutions containing less than 10 percent solids. The solutions of this invention can easily be diluted with additional solvent to a solids content of 0.5 to 10 percent prior to use.

The solutions of this invention can be employed with other treating agents commonly employed on paper and textiles such as organic resins and other wrinkle and crease resist resins and water repellents including urea formaldehyde, melamine formaldehyde, vinylacetate and acrylonitrile resins.

Articles of all kinds may be made water repellent with the materials of the present discovery. They include metals, glass, ceramics, hydraulic setting materials, especially materials of inorganic but preferably organic fibers of natural and synthetic origin, in woven and unwoven form, viz., textiles of cotton, wool, linen, polyamides, polyacrylonitriles, vinylchloridevinylidene chloride copolymerizates, and terephthalic acid-ethylene glycol polyesters, paper, leather and wood. The impregnation of leather with the material of the present discovery causes less discoloration of the leather than, for example, impregnation with solutions containing titanium compounds. In addition to becoming water repellent, treated materials, especially paper, also become adhesive.

In contrast to many previously known water repellent agents the use of resins of $SiO_{4/2}$ and triorganosiloxane units containing more than 25 mol percent triorganosiloxane units is unnecessary in the materials of the present discovery. This is an advantage, since the triorganosiloxane units are relatively difficult to obtain, or are indispensable for other purposes, for instance for heat stable organopolysiloxane oils.

The solutions of the present discovery can be applied to the materials to be rendered water repellent in any desired manner, for instance by spraying, rolling, padding or dipping. It is expedient when treating fiber materials, especially textiles, to proceed so that 0.5 percent to 10 percent, preferably 1–5 percent, organopolysiloxane are taken up, calculated on the weight of the material to be treated. After the solvent has evaporated, it is stored at room temperature for a few days to cure the impregnative material. The curing time can be shortened by using higher temperature. For example, curing is effected by heating 1–30 minutes, preferably 5–20 minutes at 100–180° C.

The following examples are included to further illustrate the invention and they do not limit the scope of the invention. All parts and percentages are based on weight and all viscosities were measured at 25° C.

EXAMPLE 1

A solution is prepared from:
26 parts of 350 cs. trimethyl siloxy endblocked dimethylpolysiloxane,
13 parts of hydroxylated copolymer of 500 cs. at 25° C. obtained by pouring equal parts of dimethyldichlorosilane and methyltrichlorosilane into water at room temperature and separating it from the water,
10 parts aluminum-tri-sec-butanolate and
49 parts trichloroethylene.

From this basic solution six parts are diluted with 94 parts of trichloroethylene. A washed and dried cotton poplin cloth is dipped into this diluted solution, conducted through two rubber rolls which wring out enough fluid so that the material still has an increase of 100 percent by weight calculated on the untreated dry material, and air dried. One part of the impregnated material is heated for 10 minutes to 180° C., the other part is stored for seven days at room temperature. Both materials possess excellent water repellency.

EXAMPLE 2

A solution is prepared from:
26 parts of a 350 cs. trimethylsiloxy endblocked dimethylsiloxane polymer,
8 parts of a hydroxylated copolymer of 500 cs. at 25° C. obtained by pouring equal parts of dimethyldichlorosilane and methyltrichlorosilane into water at room temperature and separating it from the water,
15 parts aluminum-tri-sec-pentanolate-2 and
49 parts trichloroethylene.

Six parts of this basic solution are diluted with 94 parts of trichloroethylene. A washed and dried mixed textile of wool/polyester fiber is dipped into this solution, conducted through two rubber rolls which wring out enough fluid so that the textile retains a weight increase of 100 percent calculated on the untreated dry textile, air dried and heated for 10 minutes at 180° C. The textile thus treated is eminently water repellent.

EXAMPLE 3

A solution is prepared from:
20 parts of a 450 cs. hydroxyl endblocked dimethylsiloxane polymer,
20 parts of a 35 cs. hydroxyl endblocked methyl hydrogen polysiloxane,
10 parts of aluminum-tri-sec-butanolate and
50 parts toluene.

Trichloroethylene should not be used to prepare this basic solution because it would catalyze the decomposition of methyl hydrogenpolysiloxane. Since extended storage time is desired, a non-halogenated hydrocarbon (toluene in this case) is used. Trichloroethylene can be used for the diluted dipping solution, however, since the dipping solution needs to remain stable for only a short time.

Six parts of the basic solution are diluted with 94 parts trichloroethylene for the dipping solution. A piece of thoroughly washed and dried wool coating is dipped as in Example 1, then conducted through two rubber rolls which wring out enough fluid so that the cloth still retains a weight increase of 100 percent by weight calculated on the untreated dry textile, and dried. It is then heated for 10 minutes to 180° C. The coating thus impregnated is excellently water repellent.

EXAMPLE 4

A solution is prepared from:
40 parts of a 450 cs. hydroxyl endblocked dimethylpolysiloxane,
7 parts aluminum-tri-sec-butanolate and
47 parts of trichloroethylene.

The above basic solution is diluted and used to impregnate a cotton-cellulose mixed textile as described in the Example 1. The textile becomes very water repellent from this treatment.

EXAMPLE 5

A basic solution is prepared from:
20 parts of a 450 cs. hydroxyl endblocked dimethylpolysiloxane,
20 parts of a 35 cs. hydroxyl endblocked methylhydrogen polysiloxane,
10 parts aluminum-tri-4-methylpentanolate and
50 parts toluene.

This solution is diluted and used to impregnate a cotton textile as described in Example 1. Good water repellency is obtained which is highly resistant to washing.

EXAMPLE 6

A solution is prepared from:
25 parts of 450 cs. hydroxyl endblocked dimethylpolysiloxane,
15 parts of 35 cs. hydroxyl endblocked methylhydrogen polysiloxane,
10 parts aluminum-di-sec-butanolate-mono-acetoacetic acid ethyl ester and
50 parts toluene.

The solution is diluted as described in Example 3 and used for impregnating woolen cloth. It results in excellent washfast water repellency.

EXAMPLE 7

A solution is prepared from:
26 parts of 450 cs. hydroxyl endblocked dimethylpolysiloxane,
13 parts of hydroxylated co-hydrolyzate, 500 cs. at 25° C. obtained by pouring equal parts of dimethyldichlorosilane and methyltrichlorosilane into water at room temperature and separating it from the water,
15 parts aluminum-tri-sec-butanolate,
8 parts aceto acetic acid ethyl ester,
46 parts trichloroethylene.

This solution is diluted as described in Example 1 and used to impregnate a cotton and wool cloth. Very good water repellency is obtained.

EXAMPLE 8

A solution is prepared from:
16 parts of hydroxyl endblocked 2000 cs. dimethylpolysiloxane,
8 parts of a hydroxylated co-hydrolyzate, 500 cs. at 25° C., obtained by pouring equal parts of dimethyldichlorosilane and methyltrichlorosilane into water at room temperature and separating it from the water,
76 parts toluene, which is ordinarily used for rendering paper repellent toward tacky materials. 20 parts of this solution are mixed with 10 parts aceto acetic ethyl ester, 1 part aluminum-tri-sec-butanolate and 69 parts trichloroethylene. Papyrus is dipped into this solution containing the catalyst of the present discovery. It is then air dried and heated for 10 minutes to 100° C. The paper now possesses excellent water and adhesive repellency.

EXAMPLE 9

A solution is prepared from:
4 parts of a 450 cs. hydroxyl endblocked dimethylpolysiloxane,
1.5 parts aluminum-tri-sec-butanolate,
0.5 part of aceto acetic acid ethyl ester,
94 parts perchloroethylene.

Samples of air-dry vegetable tanned sole leather as well as aniline dyed chrome upper leather were dipped into this solution for 10 minutes. Then the excess solution is removed on a rubber mill and the solvent is air dried. By comparison to untreated leather the samples show strong water repellency. Comparison with like leather samples treated with a titanium containing leather impregnant shows that the aluminum containing impregnation induces much less discoloration of the leather than the titanium containing impregnant.

EXAMPLE 10

Equivalent results were achieved when 40 parts of a 1000 cs. copolymer of 90 mol percent dimethylsiloxane and 10 mol percent methylhydrogensiloxane units endblocked with trimethylsiloxy groups was substituted for the siloxane in Example 4.

EXAMPLE 11

Equivalent results were achieved when a 500 cs. copolymer of 90 mol percent dimethylsiloxane units, 7.5 mol percent phenylmethylsiloxane units, 2.3 mol percent diphenylsiloxane units and 0.2 mol percent methylvinylsiloxane units endblocked with methoxy radicals was substituted for the siloxane in Example 9.

That which is claimed is:

1. A composition consisting essentially of an organic solvent solution of at least one organosiloxane polymer which is essentially free of $SiO_2$ groups of the general unit formula

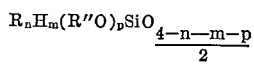

wherein each R is a monovalent hydrocarbon radical, each R" is selected from the group consisting of hydrogen atoms and monovalent hydrocarbon radicals, $n$ has a value from 0 to 3, $m$ has a value from 0 to 3, $p$ has a value from 0 to 1, in the polymeric molecules the average value of $n$ being from 0.8 to 2,8, the average value of $m$ being from 0 to 1.2, the average value of $p$ being from 0 to 1 and the average value of $m+n+p$ being from 1 to 2.8 there being at least some hydrogen or R"O groups present in each polymeric molecule and from 1 to 50 percent by weight, based on the weight of organosiloxane, of an aluminum compound selected from the group consisting of sec. alcoholates of the formula

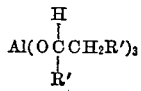

where each R' is a monovalent hydrocarbon radical and organic solvent soluble partial hydrolyzates of said sec. alcoholates.

2. The composition of claim 1 further characterized in that it contains from 1 to 2 mols per mol of aluminum present of beta-diketones of the formulae

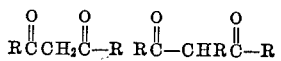

beta-ketoesters of the formulae

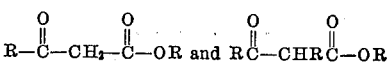

and oxyketones of the formula

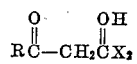

where R is a monovalent hydrocarbon radical and X is a monovalent hydrocarbon radical or hydrogen forming chelates with aluminum.

3. The composition of claim 1 further characterized in that it contains from 1 to 2 mols per mol of aluminum present of an alkyl monocarboxylic acid.

4. The composition of claim 1 wherein R and R' are methyl radicals and R" is hydrogen.

5. A fibrous substrate coated and rendered water repellent with the composition of claim 1.

References Cited

UNITED STATES PATENTS

| | | | |
|---|---|---|---|
| 2,460,799 | 2/1949 | Barry | 260—46.5 |
| 2,714,585 | 8/1955 | Agens | 260—46.5 |
| 3,367,910 | 2/1968 | Newing | 260—46.5 |

FOREIGN PATENTS

| | | |
|---|---|---|
| 674,078 | 11/1963 | Canada. |
| 759,013 | 10/1956 | Great Britain. |

DONALD E. CZAJA, Primary Examiner

M. I. MARQUIS, Assistant Examiner

U.S. Cl. X.R.

117—124, 135.1, 138.8, 142, 143, 148, 155, 161; 260—18, 33.6, 33.8, 46.5, 826, 827